(12) United States Patent
Perron et al.

(10) Patent No.: US 7,828,925 B2
(45) Date of Patent: Nov. 9, 2010

(54) METHOD FOR THE BUTT JOINING OF TWO TEXTILE PIECES

(75) Inventors: Maurice Perron, Autun (FR); Philippe Nectoux, Laizy (FR); Pascal Roy, Antully (FR)

(73) Assignee: HBI Branded Apparel Enterprises, LLC, Winston-Salem, NC (US)

( * ) Notice: Subject to any disclaimer, the term of this patent is extended or adjusted under 35 U.S.C. 154(b) by 1220 days.

(21) Appl. No.: 10/543,522

(22) PCT Filed: Jan. 12, 2004

(86) PCT No.: PCT/FR2004/000043

§ 371 (c)(1),
(2), (4) Date: May 8, 2006

(87) PCT Pub. No.: WO2004/075673

PCT Pub. Date: Sep. 10, 2004

(65) Prior Publication Data

US 2006/0213612 A1  Sep. 28, 2006

(30) Foreign Application Priority Data

Jan. 27, 2003  (FR) .................................. 03 00864

(51) Int. Cl.
*B29C 65/00* (2006.01)
(52) U.S. Cl. .............. 156/304.4; 156/304.2; 156/304.3; 156/250
(58) Field of Classification Search .............. 156/304.4, 156/304.2, 304.3, 250
See application file for complete search history.

(56) References Cited

U.S. PATENT DOCUMENTS

| 3,420,725 | A | * | 1/1969 | Curry | 156/305 |
| 3,671,352 | A | * | 6/1972 | Anderson | 156/267 |
| 3,675,247 | A | | 7/1972 | Ferrell | |
| 3,777,681 | A | * | 12/1973 | Horita | 112/470.09 |
| 3,798,677 | A | * | 3/1974 | Brown et al. | 2/409 |
| 3,859,234 | A | * | 1/1975 | Peerman | 427/247 |
| 4,608,839 | A | * | 9/1986 | Tibbals, Jr. | 66/13 |

FOREIGN PATENT DOCUMENTS

| EP | 0 708 163 | | 4/1996 |
| EP | 708163 | A2 * | 4/1996 |
| EP | 0 721 745 | | 7/1996 |
| EP | 721745 | A2 * | 7/1996 |
| FR | 2828998 | A1 * | 3/2003 |

* cited by examiner

*Primary Examiner*—Philip C Tucker
*Assistant Examiner*—Alex Efta
(74) *Attorney, Agent, or Firm*—Ohlandt, Greeley, Ruggiero & Perle, LLP

(57) ABSTRACT

The invention relates to a process for flat edge-to-edge assembly of two portions of textile parts by means of a gluing ribbon overlapping the two edges. According to this process, before the gluing ribbon is put into place, two borders adjacent to the edges are glued onto each other, so as to hold the edges close to each other. The two glued borders are shorn close to where the two edges are fixed together, and the gluing ribbon (28) is applied overlapping the two edges that are brought together. The shorn glued borders, are flattened when applying the gluing ribbon.

13 Claims, 2 Drawing Sheets

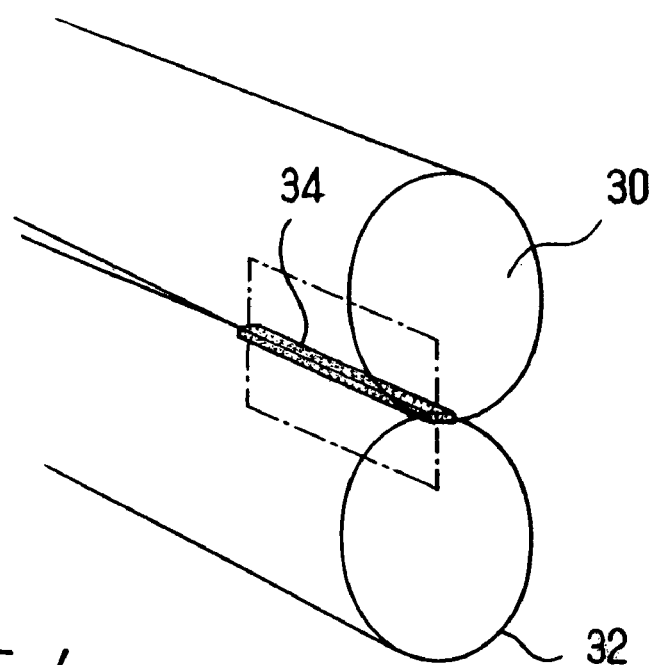
FIG_4
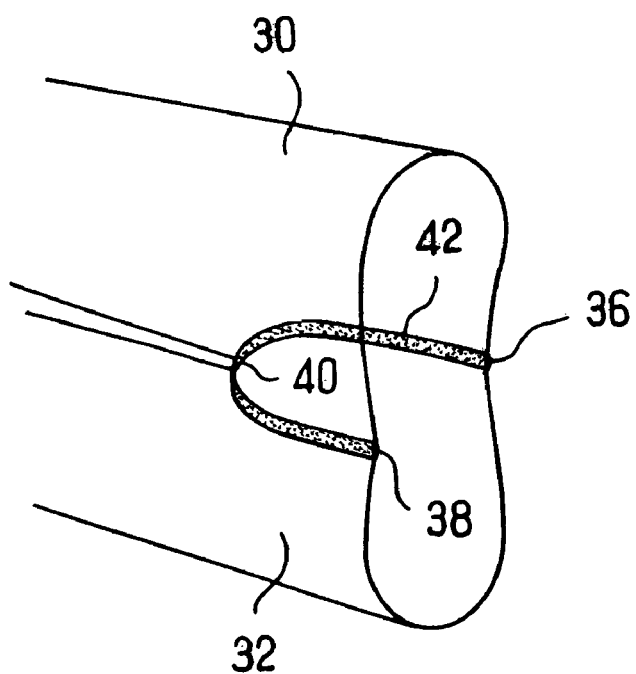
FIG_5

METHOD FOR THE BUTT JOINING OF TWO TEXTILE PIECES

FIELD OF THE INVENTION

The present invention relates to a process for edge-to-edge assembly of two portions of textile parts.

DESCRIPTION OF RELATED ART

One of the various envisaged applications is particularly but not exclusively for underclothes. Underclothes may be made by assembling several parts and fixing them together by sewn seams that usually form rough parts. These rough parts are uncomfortable for the person wearing the said underclothes and/or may create a relief effect that can be visible on the clothes covering the underclothes.

Processes are known for assembling textile parts. They consist of edge-to-edge gluing of the said parts, for example using polyamide type hotmelt plastics, for which melting points are compatible with the thermal resistance of the textiles.

However, thermogluing of one edge to another edge forms a glued strip that is extremely stiff compared with the textile parts, but also creates a surface discontinuity between the two parts since they are not assembled in the same plane.

SUMMARY OF THE INVENTION

To overcome this, it was decided to apply a gluing ribbon on the two edges facing the two textile parts to keep the said two parts together in the same plane. However, it is not easy to keep the two edges in a fixed position facing each other and to apply the gluing ribbon simultaneously on the two edges while overlapping each other.

Thus, one purpose of this invention is to propose a process for easily making an edge-to-edge assembly of two textile parts without leaving any surface roughness or discontinuity between the two parts.

In order to achieve this, this invention proposes a process by which before the said gluing ribbon is put into place, two borders adjacent to the said edges are glued onto each other, so as to hold the said edges close to each other, the two borders close to the said two edges are shorn, the said gluing ribbon is applied overlapping the two edges brought together and the said shorn glued borders, and the said shorn glued borders are flattened when applying the gluing ribbon.

Thus, one characteristic of the invention is in the method for preliminary edge-to-edge assembly of the two textile parts using borders that prolong them and that are glued together one against the other. In this way, the edges of the said textile parts are kept together facing each other, the borders having been shorn at least partially as close as possible to the said edges held together, without the need for any other means to hold them in place in this position. It is then easy to apply the ribbon overlapping on the shorn glued border and on the edges held together and to flatten the assembly to make all roughness disappear.

According to one particular advantageous embodiment of the invention, the two adjacent borders are thermoglued and a heat-reactivatable ribbon is used to glue the two edges, such that the said shorn glued borders are unglued and flattened when the ribbon is thermoglued.

Due to the use of hotmelt glues, firstly the borders are assembly quickly, and secondly the borders can be adjusted before they are fixed. The hotmelt glue is not sticky at ambient temperature, such that the borders can be positioned with respect to each other such that the said edges are brought towards each other.

The two adjacent borders are then held together and are hot pressed during a short time in order to melt the adhesive. When the adhesive temperature drops, it returns to its solid state and thus mechanically fixes the two borders together.

Furthermore, when the heat-reactivatable ribbon is applied to the shorn glued borders and hot pressed also in contact with the two edges, the hotmelt glue that connects the two shorn glued borders tends to melt again so that they separate from each other while the said edges are held together in the same plane by the said heat-reactivatable ribbon. The borders are thus flattened by the said ribbon and no roughness appears at the junction between the two textile parts.

According to one particularly advantageous embodiment of the invention, the two portions of textile parts are made of knit fabric. Consequently, the assembly of knitted parts usually consisting of a sewn seam and that forms a roughness making the assembly inaesthetic and uncomfortable, can be made using the process described above. The result is that knitted parts can be joined together without any surface non-uniformity, which makes the made-up assembly more comfortable.

Advantageously, the two textile parts are made from a tubular knit suitable for making very lightweight textile articles for which the assembly according to the invention described above is perfectly appropriate since it avoids the formation of any roughness.

According to one preferred embodiment, two textile parts are glued to each other, particularly along a gluing strip, the two textile parts are cut longitudinally in the gluing strip firstly to obtain two pairs of portions of textile parts glued by borders composed of a cut part of the said strip, and the process according to the invention and described above is applied to at least one of these pairs of portions of textile parts. As will be explained in more detail in the detailed description given below, this preferred embodiment of the invention makes it possible to assemble textile parts without forming any roughness between them, with a limited number of operations.

According to another purpose, this invention proposes leg wear such as tights, made up from two tubular knits assembled by an assembly process according to the invention.

Other features and advantages of the invention will become clear after reading the following description of particular embodiments of the invention, given for guidance but in no way limitative, with reference to the attached drawings on which:

BRIEF DESCRIPTION OF THE DRAWINGS

FIG. 4 is a diagrammatic partial perspective view illustrating a process for assembling two tubular knits according to the invention after a first step; and FIG. 5 is a diagrammatic partial perspective view showing the two tubular knits illustrated in FIG. 4, assembled according to the invention.

DETAILED DESCRIPTION OF THE INVENTION

Figure 1:
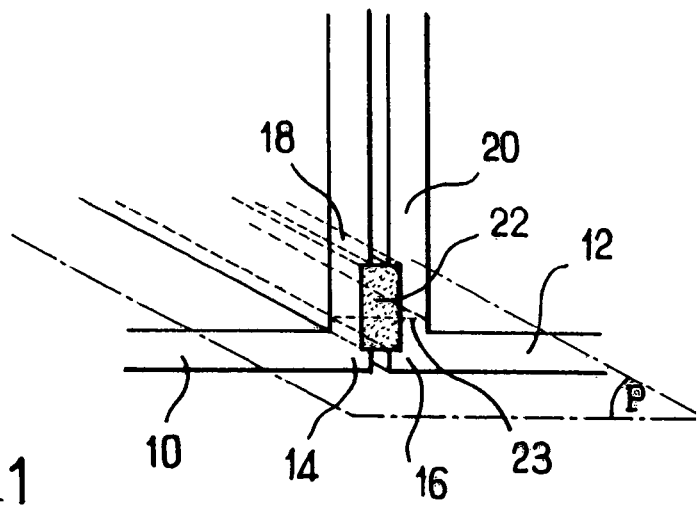
FIG. 1 is a diagrammatic partial perspective view of one embodiment of the invention in which two textile parts are connected together in a first step.

FIG. 1 shows two portions 10, 12 of textile parts for which the corresponding edges 14, 16 are held close to each other by the connection of the corresponding adjacent borders 18, 20 using a hotmelt adhesive 22.

The hotmelt adhesive 22, initially in the form of a strip between 5 and 20 mm wide, for example 10 mm wide, is adjusted between two adjacent borders 18, 20 along the edges 14, 16. At ambient temperature, the adhesive is not at all sticky, and the two portions 10, 12 of the textile parts are not fixed to each other until after the two adjacent borders 18, 20 have been hot pressed into contact with each other, and after the hotmelt adhesive 22 has cooled. Obviously, as illustrated in FIG. 1, as the adhesive 22 melts, it flows into the adjacent borders 18, 20 such that the adhesive penetrates into the textile.

Advantageously, the hotmelt adhesive is a polyurethane type plastic material which is elastically deformable. However, other types of materials such as polyamides or polyesters will be possible.

After the two adjacent borders 18, 20 have been glued together, these two glued borders are shorn on plane P illustrated in FIG. 1, which is close to and parallel to the upper surfaces of portions 10, 12 for which the intersection 23 with the two adjacent borders 18, 20 is shown in FIG. 1 in discontinuous lines.

Figure 2:
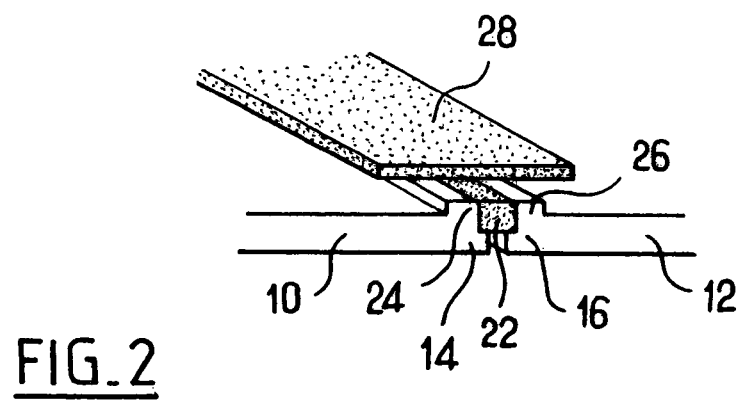
FIG. 2 is a diagrammatic partial perspective view illustrating a second step in the assembly process according to the invention and illustrated in FIG. 1.

As shown in FIG. 2, the result is the two portions 10, 12 of textile parts held together edge 14 to edge 16 by their shorn glued borders 24, 26. These shorn glued borders 24, 26 that form the junction between the two portions 10, 12 are very slightly rough, and this roughness can be eliminated in a subsequent step.

This subsequent step consists of applying a flat gluing ribbon 28, preferably a heat-reactivatable ribbon, longitudinally overlapping the two edges 14, 16 brought together and the shorn glued edges 24, 26.

When the heat-reactivatable ribbon 28 is hot pressed in contact with the shorn glued borders 24, 26, the edges of the ribbon 28 are bonded respectively to the edges 14, 16 of the two portions 10, 12, while the hotmelt adhesive 22 that partially connects the shorn glued edges 24, 26 together, melts and releases them from each other.

Consequently, the action of pressing makes the heat-reactivatable ribbon 28 hold the edges 14, 16 in contact facing each other and in the same plane, and the heat-reactivatable ribbon 28 penetrates into each of the portions 10, 12.

Figure 3:
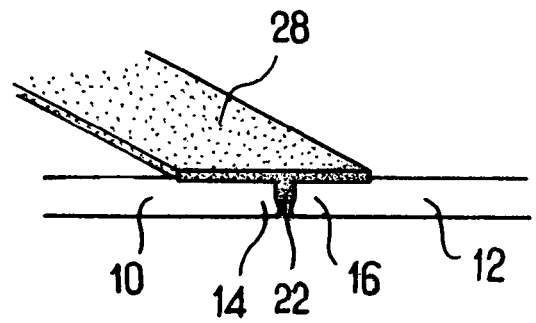
FIG. 3 is a diagrammatic partial perspective view showing a final step in the assembly process according to the invention and illustrated in FIG. 2.

FIG. 3 thus shows the two portions 10, 12 fixed to each other using the heat-reactivatable ribbon 28 that connects them overlapping the two edges 14, 16, and that can mix with the hotmelt adhesive 22.

Thus, with the assembly process according to the invention, the result obtained is two portions 10, 12 of textile parts connected together approximately along the same plane by a heat-reactivatable ribbon that at least partially penetrates into the textile such that the junction between the two parts is not at all rough.

Advantageously, the heat-reactivatable ribbon 28 with a width of between 5 and 25 mm, for example 10 mm, is made of thermofusible polyurethane that can be glued at a temperature of 220° C. for 20 seconds, for example under a beam press. Polyurethane has the advantage that it is elastically deformable such that there is very little discontinuity of the mechanical properties between the two portions 10, 12 of the textile parts.

On the other hand, when the textiles are knits, which are also elastically deformable, the mechanical discontinuity between the two assembled portions is lower.

The assembly process according to the invention was applied to making panty hose from two tubular knits for the legs and that will be described with reference to FIGS. 4 and 5. A heat-reactivatable adhesive strip with two opposite faces that can be activated at a temperature of between 180 and 220° C., for example 200° C., is also used, one of these faces being covered by a cardboard strip and the other being free. Advantageously, the faces of the thermogluing adhesive strip are impregnated with a second adhesive that is cross-linkable at a temperature of more than 200° C., for example 220° C. Consequently, in a first step, the thermogluing adhesive strip can be applied with the free face in contact with the first knit at a temperature of 200° C., to be bonded to it; in a second step, after the cardboard strip has been removed, the second knit can be applied in contact with the thermogluing adhesive strip to be bonded to the first knit by pressing the assembly together at a temperature of 220° C. Thus, not only the other face of the adhesive strip bonds to the second knit, but the second thermo cross-linkable adhesive that was not activated during the first step is activated in the second step and reinforces the bond between the two knits.

FIG. 4 shows a first textile part 30 composed of a tubular knit with an opening placed above a second identical textile part 32.

Firstly, a thermogluing adhesive strip 34 supported by a cardboard strip is applied longitudinally, the adhesive in contact with the outside surface of the second tubular knit 32 and starting from the opening on a portion called the chimney. This longitudinal portion forms a reference mark and is usually reinforced.

The length of this thermogluing adhesive strip 34 is approximately the same as the length of the said chimney, and is chosen so as to make the portion forming the pants part of the panty hose.

After the thermogluing adhesive strip 34 has been applied in contact with the second tubular knit 32, the assembly is hot pressed so as to fix one of the faces of the thermogluing adhesive strip 34 to the said second tubular knit 32, the said cardboard strip preventing the other face of the thermogluing adhesive strip 34 from sticking to the pressing means.

The said cardboard strip is then removed and the first textile part 30 also consisting of a tubular knit is applied symmetrically in contact with the second tubular knit 32, with the two chimneys in contact with each other, the thermogluing adhesive strip 34 being located between the two tubular knits 30, 32.

Thus, by hot pressing the two portions of the tubular knit composed of chimneys together, the thermogluing adhesive strip 34 melts and then solidifies as it cools when pressing stops. The two tubular knits 30, 32 are then connected together longitudinally, their external walls in contact with each other, the two chimneys in contact with each other, using the said thermogluing adhesive strip 34. Two edges of portions of tubular knits are brought adjacent to each other and run along the two opposite edges of the said glued chimneys, the said two edges corresponding to the two edges 14, 16 illustrated in FIG. 1.

The two chimneys glued to each other are then split in order to obtain two pairs of half chimneys glued together by a thermogluing adhesive half strip 34.

Thus as shown in FIG. 5, the two pairs of half chimneys have two separate first ends 36, 38 at the edge of the corresponding openings of the two tubular knits 30, 32 and two ends joined together at the junction 40 of the two tubular knits 30, 32. The first two separate ends 36, 38 are located in the front and back parts of the panty hose respectively, or vice versa.

The two pairs of half chimneys glued together correspond to the adjacent borders 18, 20 illustrated in FIG. 1 and glued together by the hotmelt adhesive 22.

Similarly, the two pairs of glued half chimneys are shorn close to the said two edges of the portions of tubular knits brought together, and a heat-reactivatable ribbon 42 is then applied on the pairs of the shorn glued half chimneys that are hot pressed together. Thus, the said two edges of the tubular knit portions brought together are bonded to each other without any surface non-uniformity between the portions. In this way, seamless tights are obtained in which there is no roughness at the connection between the two tubular knits.

The assembly process according to the invention is applicable to other types of textile products obtained on a Jacquard circular knitting machine or on a shuttle loom or even to non-woven textile products.

For example, garters can be applied and connected to the panty hose using the process according to the invention. It can also be used for rib ends on leggings or for making ankle socks, brassieres or bras.

The process according to the invention is perfectly adaptable for the assembly of symmetrical tubular knits that will be slit to form a first part facing the slit that can cover a trunk portion, and two second parts corresponding to the intact tubular portion of the knits and that can be used to over two members (legs or arms).

For example this is the case for underpants, smock tops or shirts.

The invention claimed is:

1. A method for flat edge-to-edge assembly of two facing edges of two textile parts using a gluing ribbon overlapping the two edges, comprising
    gluing together two borders of the two textile parts to form a gluing strip, one of said two borders being adjacent to one of the two facing edges, and the other of said two borders being adjacent to the other of the two facing edges to hold the two edges together;
    shearing said two borders close to the two edges;
    applying said gluing ribbon to overlap the two facing edges and said shorn glued borders; and
    flattening said shorn glued borders when applying said gluing ribbon
    wherein said shorn glued borders become unglued and flattened when said gluing ribbon is glued to said shorn glued borders.

2. The method according to claim 1, wherein the two facing edges of said textile parts are made of knit fabric.

3. The method according to claim 2 wherein said two textile parts are made from a tubular knit.

4. The method according to claim 2 further comprising after the step of gluing together said two borders of said two textile parts, cutting longitudinally said two textile parts in said gluing strip to obtain two pairs of portions of textile parts.

5. The method according to claim 4 wherein said two textile parts are two tubular knits, said two tubular knits being glued to each other to create a gluing strip.

6. The method of claim 1, wherein said two borders of said textile parts are thermoglued together.

7. The method of claim 1, wherein said gluing ribbon is thermoglued to said shorn borders.

8. The method of claim 1, wherein said gluing ribbon is a heat-activatable ribbon.

9. A method of making a garment formed from two tubular textiles comprising:
    providing two tubular textiles;
    gluing together a portion of said two tubular textiles along a line parallel to their longitudinal axes to form a symmetrical garment;
    cutting along a longitudinal axis of said portion to form a pair of glued shorn borders, each of said pair of glued shorn borders having a facing edge;
    applying a gluing ribbon to overlap said two facing edges and said glued shorn borders; and
    flattening said glued shorn borders when applying said gluing ribbon
    wherein said shorn glued borders become unglued and flattened when said gluing ribbon is glued to said shorn glued borders.

10. The method according to claim 9, further comprising hot pressing said gluing ribbon to said glued shorn borders.

11. The method according to claim 9, wherein said tubular textiles are knitted.

12. The method according to claim 9, wherein said tubular textiles are formed using a Jacquard circular knitting machine, a shuttle loom or a non-weaving process.

13. The method according to claim 9, wherein said garment is a pair of tights.

* * * * *